Fig. 1.

Feb. 2, 1932.  J. S. REYNOLDS  1,843,339
HEAVY DUTY ROTARY SCRAPER
Filed May 18, 1927  4 Sheets-Sheet 4

Patented Feb. 2, 1932

1,843,339

UNITED STATES PATENT OFFICE

JOSEPH S. REYNOLDS, OF LONG BEACH, CALIFORNIA, BY DECREE OF DISTRIBUTION TRANSFERRED ONE-HALF TO OLIVE M. REYNOLDS AND ONE-HALF TO OLIVE M. REYNOLDS AND SECURITY-FIRST NATIONAL BANK, OF LOS ANGELES, CALIFORNIA, TRUSTEES OF SAID JOSEPH S. REYNOLDS, DECEASED

HEAVY-DUTY ROTARY SCRAPER

Application filed May 18, 1927. Serial No. 192,407.

My invention relates to rotary scrapers, such as are used for moving earth.

It is a general object of the invention to provide a rotary scraper in which the scoop thereof is automatically moved into carrying position when it becomes loaded.

Another object of the invention is to provide a scraper of this general character which may be adjusted for automatically moving into carrying position for different weights of load; or so that it may be manually controlled.

A still further object of the invention is to provide a rotary scraper in which the scoop is prevented from revolving when the scraper is backed.

A still further object of the invention is to provide a scraper of the character mentioned in which the scoop may be locked in scraping position.

Another object of the invention is to provide a rotary scraper in which the scoop may be allowed to revolve when it is moved forward or backward, by operating a single release means.

Very often in using a rotary scraper, obstacles such as hidden boulders, stumps, or the like, are encountered, these being engaged by the cutting blade of the scoop. This places a great strain on the scoop, distorting it, and sometimes tearing the cutting blade entirely from the scraper.

It is an object of this invention to provide a scraper in which the scoop is automatically released when the cutting pressure against the cutting blades exceeds a certain maximum. By this feature of the invention, when a stump or other obstacle is engaged, the cutting pressure reaches a maximum, at which time the scoop is released so that it may revolve, this eliminating strains on and destruction of any part of the scraper.

In moving dirt short distances, as when cutting through a hill or a road where there is not sufficient room to turn a tractor and scraper around, or in excavating a cellar, it is sometimes desirable to hold the scraper rigid with respect to the tractor so that short forward cuts can be made, the scraper dumped and then backed into a position ready to take on another load.

It is a further object of my invention to provide a scraper that may be held rigidly to the tractor when backing.

Other objects and advantages of the invention will be made evident hereinafter.

Referring to the drawings in which I illustrate a preferred form of the invention.

Figure 1:
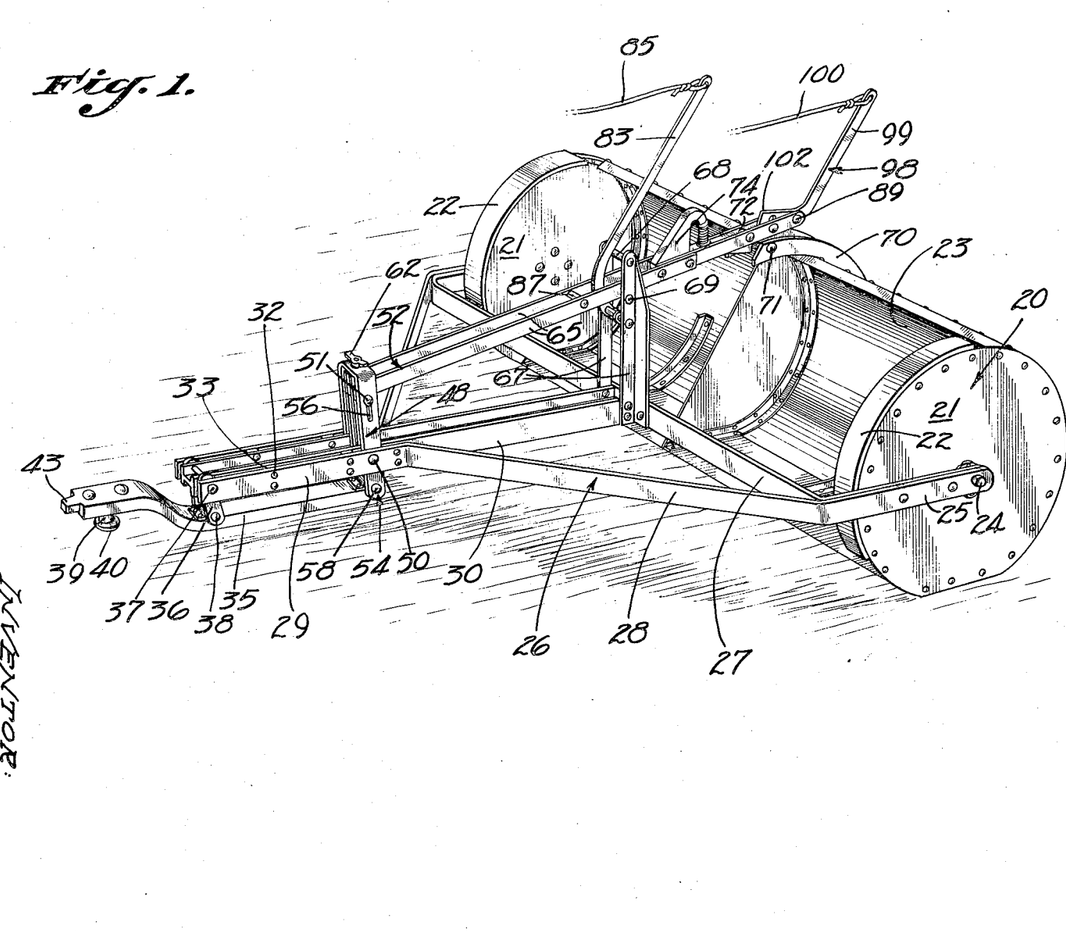
Fig. 1 is a perspective view.

The form of the invention illustrated in the drawings has a scoop 20. The scoop 20 has end members 21 which carry runners 22 and a wall 23 which provides a bowl for receiving the earth. The end members 21 carry trunnions 24 to which rear legs 25 of a main frame 26 are pivoted. The main frame 26 has a cross-bar 27 and side frames 28, the ends of which cooperate to provide the legs 25. The side frames 28 extend diagonally inward and have forward projecting parts 29 which extend parallel to the direction of motion of the scraper adjacent to a central bar 30. The central bar 30 at its rear end is connected to the cross-bar 27. As illustrated best in Fig. 1, the forward parts 29 of the side frames 28 are connected to the central bar 30 by rivets or other suitable means 32, but are spaced a distance therefrom by spacers 33.

Figures 10, 11:
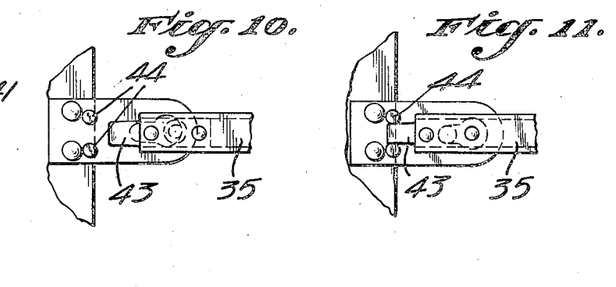

At the forward part of the scraper is a pull-bar 35 which comprises a pull-means of the invention. The forward part of the pull-bar 35 is connected to the forward end of the main frame 26 by means of links 36 which are pivoted at 37 to the main frame and at 38 to the pull-bar. The forward end of the pull-bar is bent upward and rests in substantially the same plane as the front end of the main frame 26. For connecting the pull-bar to a tractor I provide a downward-projecting pin 39 having a head 40 on its lower end. This pin 39 is adapted to extend through a slot 41 of a draft-bar 42 connected to the tractor, by means of which the scraper is to be pulled. Projecting forward from the pull-bar 35 is a projection 43 which is capable of being extended through a pair of guide pins 44 which project upward from the draft-bar 42. The projection 43 extends between the pins 44 when the scraper is being backed. (See Fig. 11.) When in this position it is impossible for the scraper to swing out of position behind the vehicle which is backing it.

Figure 6:
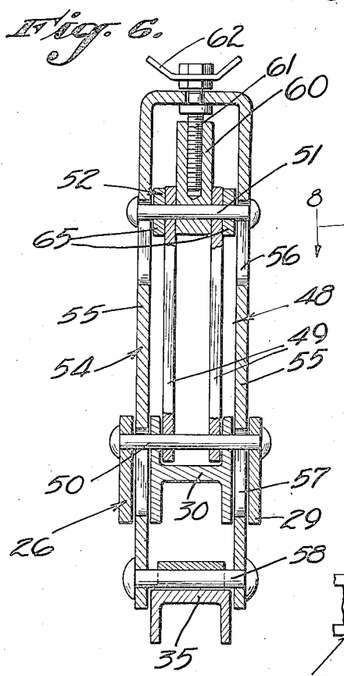
Fig. 6 is a section taken on the line 6—6 of Fig. 2.

The rear end of the pull-bar 35 is supported by a rocker or lever 48. As illustrated best in Fig. 6 the lever 48 consists of an upper lever-arm or a primary lever-arm 49 consisting of a pair of links pivoted on a main pivot-bolt 50 which is carried by the main frame 26. Pivoted by means of an upper pivot 51 to the upper end of the upper lever-arm 49 is a latch-bar 52 which is a part of the draft-control means of the invention. Extending around the upper lever-arm 49 is a secondary lever-arm or lower lever-arm 54. The lower lever-arm 54 is in the shape of an inverted U having legs 55 in which upper slots 56 and lower slots 57 are provided. These slots 57 and 56 receive the ends of the main pivot-bolt 50 and the upper pivot 51. The lower lever-arm is so supported that it is slidable relative to the upper lever-arm 49 in such a manner as to change the effective length thereof. The lower end of the lower lever-arm 54 extends through the spaces between the side bars and central bar of the main frame and carries a lower pivot 58 at the lower end of it. This lower pivot 58 has the rear end of the pull-bar 35 pivotally attached thereto.

Figure 5:
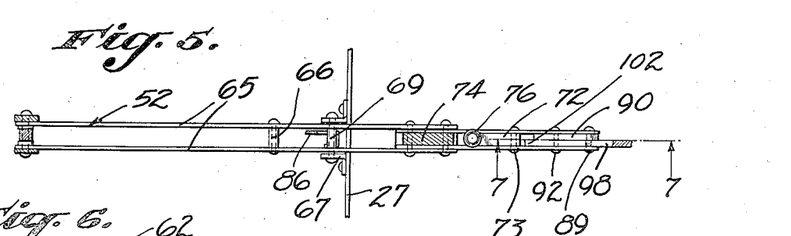
Fig. 5 is a section taken on the line 5—5 of Fig. 2.

For the purpose of adjusting the lever 48 I provide a block 60 which is connected to the upper end of the upper lever-arm 49 as shown, and a screw 61 which is connected to the upper part of the lower lever 54 as shown. The screw 61 has a handle 62 by means of which it may be rotated. By rotating the screw so that it moves upward from the block 60 the lower lever-arm 54 may be raised so that the distance from the main pivot 50 to the lower pivot 58 is shortened, or vice versa. The latch-bar 52, as illustrated best in Figs. 1 and 5, has a pair of parallel bars 65 which extend rearward, terminating at a point above the scoop 20. These bars 65 are rigidly secured together by means indicated at 66. For guiding the rear end of the latch-bar 52 I provide a standard comprising a pair of vertical legs 67 which are secured to the main frame 26 where the cross-bar 27 and the central bar 30 meet. The vertical legs 67 carry an upper limit rod 68 and a lower limit rod 69 between which the latch-bar 52 extends.

Figure 2:
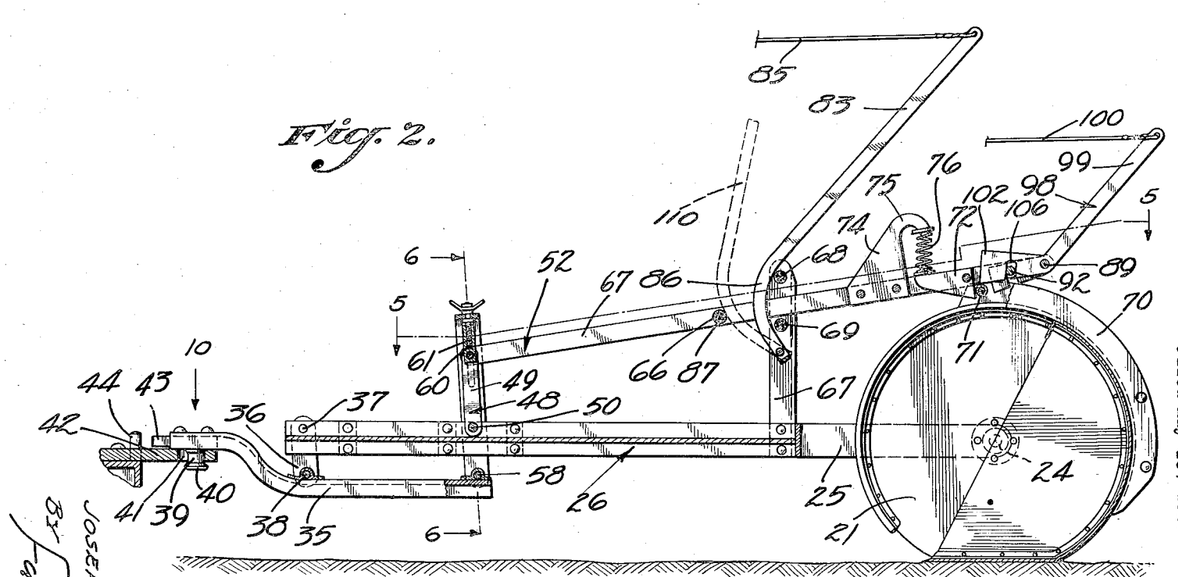
Fig. 2 is an elevational cross section showing the scraper of my invention in carrying position.
Figure 3:
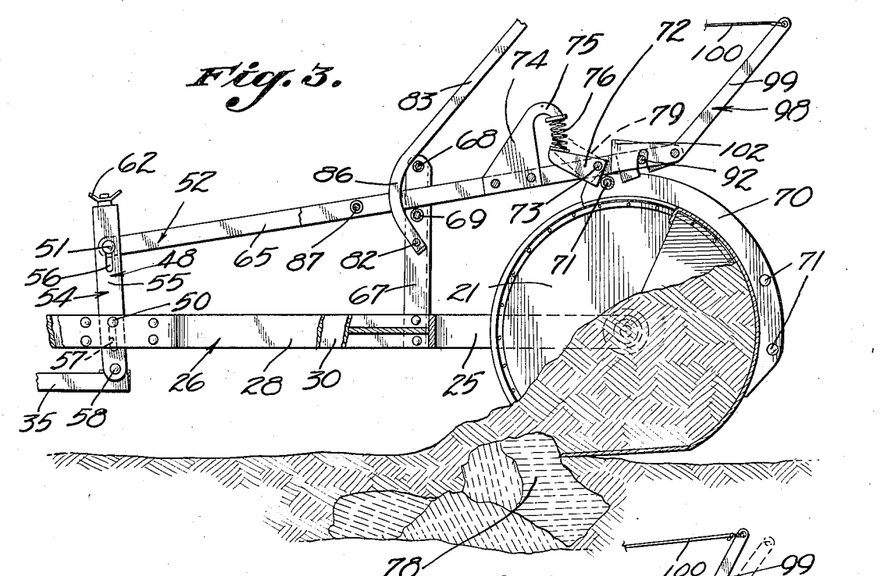
Fig. 3 is a fragmentary view similar to Fig. 2 showing the manner in which the scoop is released when an obstacle is encountered.
Figure 4:
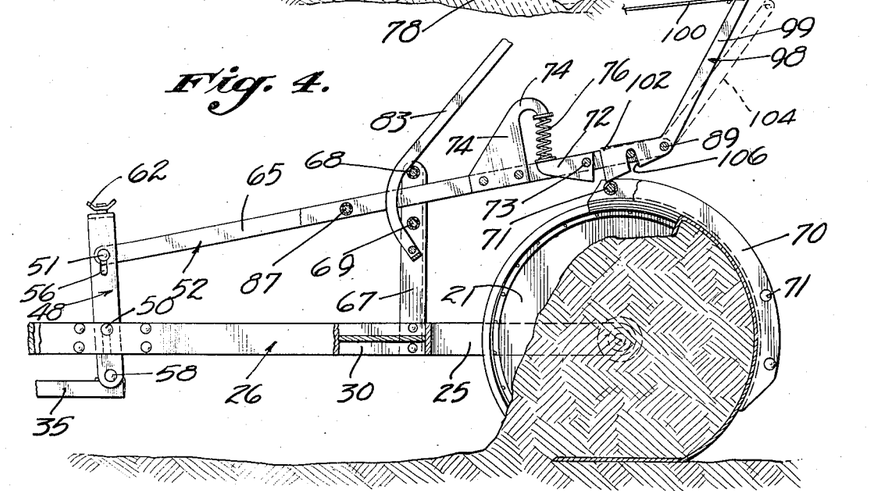
Fig. 4 is a similar sectional view showing the manner in which the scoop is allowed to revolve.

At the central part of the scoop 20 is a stop-carrying member in the form of a channel 70. The channel 70 carries a plurality of stops 71. The latch-bar 52 has an engager 72 pivoted thereto by means of a rod 73. This engager 72 is in such a position that it may be engaged by one of the stops 71 and thus prevent the scoop from rotating in an anti-clockwise direction. Secured to the latch-bar 52 adjacent to the engager 72 is a spring-holder 74, and placed between a free end of the engager 72 and a neck 75 of the spring-holder 74 is a compression spring 76. The compression spring 76 is adapted to resiliently retain the engager 72 in a position to engage one of the stops 71. The spring 76 and its holder comprise a means for resiliently holding the engager in engaging position. In Figs. 2 and 4 the engager is shown in normal position. In Fig. 3 the scoop is shown in engagement with a hidden obstacle such as a rock indicated by the numeral 78. At this time the cutting pressure exceeds the maximum, and the spring 76 will yield. This causes the engager 72 to move from the position shown in Figs. 2 and 4 through the full line position shown in Fig. 3 and into the position indicated by dotted lines 79 of Fig. 3. When this occurs, the stop 71 which has been in engagement with the engager 72 is permitted to move past the engager and the scoop will revolve.

Connected to the vertical legs 67 of the standard is a pivot 82 which carries an operating-lever 83. The operating-lever 83 may be pulled forward by the operator by means of a flexible member 85 which extends from the upper end of the lever 83 to the seat of the vehicle by which the scraper is pulled. When moved forward, a curved part 86 of the operating-lever 83 engages a rod 87 carried by the latch-bar 52 moving it slightly forward. This is done when the scoop is in carrying position and it is adapted to move it into scraping position. By thus moving the latch-bar 52 forward, the engager 72 is moved forward so that the scoop is permitted to revolve a small part of a revolution and into scraping position.

Figure 7:
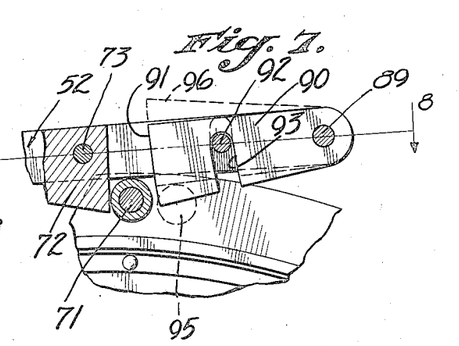
Fig. 7 is a section taken on the line 7—7 of Fig. 5.
Figure 8:
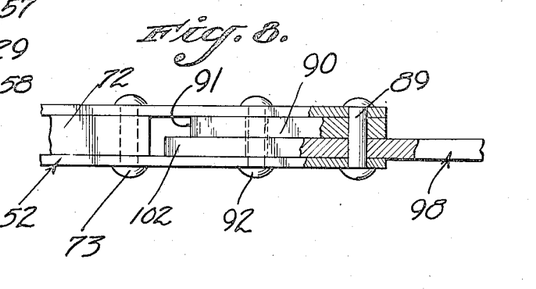
Fig. 8 is a section taken on the line 8—8 of Fig. 7.
Figure 9:
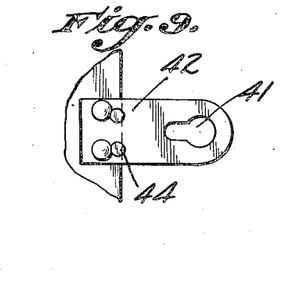
Figs. 9, 10 and 11 are fragmentary views illustrating a hitch of the invention.

Pivoted to the rear end of the latch-bar 52 by means of a pivot-pin 89 is a backup-member in the form of a plate 90. A forward face 91 of the plate 90 is spaced a short distance in back of a back face of the engager 72, leaving a space for a stop 71 to rest between these parts. In Fig. 7 the backup-plate 90 is shown in full lines in its normal position, being retained in this position by means of a support-pin 92 which occupies a position in a slot 93 of the backup-plate 90. This backup-plate 90 prevents the scoop from revolving when the scraper is backed up. It will be seen that in backing, the friction of the ground against the scraper tends to rotate it in a clockwise direction. One of the stops 71 will prevent this clockwise rotation by engaging the face 91 of the backup-plate 90. The backup-plate 90, however, being pivoted, will not prevent a stop from moving into engagement with the engager 72. In Fig. 7 dotted lines 95 represent a stop moving in an anti-clockwise direction into a position shown by full lines in Fig. 7. At this time the backup-plate 90 is swung upward into a position indicated by dotted lines 96 in Fig. 7. For the purpose of releasing any of the stops 71 from engagement with the engager 72 I provide a release means illustrated best in Figs. 2, 3, 4, 7 and 8. This release means is provided in the form of a lever 98 which is pivoted on the pivot-pin 89. The lever 98 has an upward projecting arm 99, to the upper end of which an operating member in the form of a flexible member 100 is connected, this flexible member 100 extending to the vehicle which is pulling the scraper. The lever 98 also has a release portion 102 which rests adjacent the backup-plate 90 but is slightly longer so that the forward end thereof rests above a stop 71 which is in the space between the engager 72 and the backup-plate 90. When it is desired to release the stop from engagement with the engager 72, the flexible member 100 is pulled upon so as to move the release means or the lever 98 from the position shown in full lines in Figs. 1, 2 and 3 and by dotted lines 104 in Fig. 4 into a position shown by full lines in Fig. 4. This will cause the forward end of the release portion 102 to engage the adjacent stop 71. This swings the rear end of the latch-bar 52 upward so that the engager 72 will be moved out of the path of the stops 71. This operation will also lift the backup-plate 90 from the path of the stops 71 so that the scoop is free to revolve in either direction. The release portion 102 of the lever 89 is provided with a slot 106 through which the bar 92 is extended, this bar 92, limiting the lower position of the release portion 102.

A complete operation of the invention is as follows:

The pull-bar 35 is readily attached to a tractive vehicle by jacking up the front end of the scraper so that the draft-bar 42 may be moved under the forward end of the pull-bar 35. The opening 41 is brought into registry with the pin 39 and the front end of the scraper is then lowered so that the pin 39 extends through the opening 41 as illustrated in Fig. 2. The head 40 of the pin 39 will serve to hold it in place in the opening 41. When making turns there is a possibility of the grousers on the wheels engaging the frame of the scraper. Ordinarily, this would tend to damage the frame, but in my invention the form of connection will permit the front end of the scraper to be moved upward by the force thus applied, and the only thing which will occur is a detachment of the scraper from the draft vehicle. It will be seen from Figs. 1 and 2 that the scraper is pulled entirely through the pull-bar 35. This pull tends to swing the lever 48 in a clockwise direction and to force the latch-bar 52 rearward. This causes the engager 72 to press against the stop 71 which is in engagement therewith. On the other hand, the friction of the scoop against the ground tends to rotate the scoop 20 in an anticlockwise direction so that the tendency for the latch-bar 52 to be forced backward is counteracted, and if the lever is properly adjusted there will be no movement. The lever must be adjusted so that the lever-arms are of proper relative lengths. The scraper is pulled over the ground in the position shown in Figs. 1 and 2 which is a carrying position. When it is desired to scrape, the operator pulls on the flexible member 85 which swings the operating-lever 83 into a position indicated by dotted lines 110 so that the bar 87 is engaged. This pulls the latch-bar 52 forward and permits the scoop 20 to move in an anticlockwise direction and into scraping position. The scoop 20 will then gather a load of earth. The weight of the load collected in the scoop increases the moment tending to rotate the scoop into carrying position. When the weight of the load reaches a predetermined amount the moment tending to rotate the scoop into carrying position overcomes the moment tending to hold the scoop in digging position and the scoop will be automatically moved into carrying position. When the scoop moves into carrying position there is a relative movement between the main frame 26 and the pull-bar 35, the pull-bar moving forward relative to the main frame. It will be seen that this changes the relative position of the main pivot 50 and the lower pivot 58 so that resultingly the lever 48 is moved in a clockwise direction. This pushes backward on the latch-bar 52 and the scoop 20 is moved in a clockwise direction and into carrying position. By adjusting the lever 48 the scoop may be moved from scraping position into carrying position when any weight of load (within a certain range) is accumulated in the scoop 20. The lever 48 is of such a design that it may be readily adjusted by merely rotating the screw 61 which raises or lowers the secondary lever-arm 54.

When a load of earth has been accumulated and the scoop 20 is in carrying position it may be dumped by pulling on the flexible member 100 which operates the lever 98 as previously explained. The scoop at this time will be permitted to revolve in an anti-clockwise direction and thus emptied.

When traveling over hard ground in scraping position there is a tendency for chattering and for the cutting edge of the scoop to move out of scraping position. In my invention the backup-plate 90 prevents the scoop from moving in a clockwise direction and thus retains the scoop in scraping position.

As previously mentioned, when an obstacle as indicated at 78 is encountered the stop 71 which is at that time engaged by the engager 72 will be automatically released so that no damage will be done to the scraper.

The backup-plate in addition to preventing the scoop from chattering also prevents the scoop from rotating in a clockwise direction when the scraper is being moved in a backward direction. It is often desirable to back up the scraper so that in transferring earth only a short distance, the scraper will not have to be moved through an entire circle but can be merely moved back and forth. The latch-bar being pivoted will not interfere with any of the stops 71 moving into engagement with the engager 72.

I claim as my invention:

1. In a scraper of the character described, the combination of: a main frame; a scoop pivoted to and supporting one end of said main frame; latch-means supported by said main frame; a stop carried by said scoop; an engager carried by said latch-means adapted to engage said stop and restrain said scoop from revolving; and backup-means carried by said latch-means, said backup-means being engaged by said stop when said scraper is backed, said backup-means being movable relative to said latch-means so that said stop may move into engagement with said engager.

2. In a scraper of the character described, the combination of: a main frame; a scoop pivoted to and supporting one end of said main frame; latch-means supported by said main frame; a stop carried by said scoop; an engager carried by said latch-means adapted to engage said stop and restrain said scoop from revolving; and release-means carried by said latch-means, said release-means being adapted to engage said stop and move said latch-means so as to disengage said engager and said stop.

3. In a scraper of the character described, the combination of: a main frame; a scoop pivoted to and supporting one end of said main frame; latch-means supported by said main frame; a stop carried by said scoop; an engager carried by said latch-means adapted to engage said stop and restrain said scoop from revolving; backup-means carried by said latch-means, said backup-means being engaged by said stop when said scraper is backed, said backup-means being movable relative to said latch-means so that said stop may move into engagement with said engager; and release-means associated with said latch-means, said release-means being adapted to move said latch-means so as to disengage said engager and said stop.

4. A rotary scraper comprising: a scoop; a main frame, said scoop being pivoted thereto; latch-means supported by said main frame; a stop carried by said scoop; an engager carried by said latch-means adapted to engage said stop and restrain said scoop from revolving, said engager being movable from engaging to non-engaging position; and pressure-resisting means for retaining said engager in engaging position, said means resisting the tendency of said scoop to rotate forwardly.

5. In a scraper of the character described, the combination of: a main frame; a scoop pivoted to and supporting one end of said main frame; latch-means supported by said main frame; a stop carried by said scoop; an engager carried by said latch-means adapted to engage said stop and restrain said scoop from revolving, said engager being movable from engaging to non-engaging position; pressure-resisting means for retaining said engager in engaging position; and backup-means carried by said latch-means, said backup-means being engaged by said stop when said scraper is backed.

6. A rotary scraper comprising: a scoop; a main frame, said scoop being pivoted thereto; latch-means supported by said main frame; a stop carried by said scoop; an engager carried by said latch-means adapted to engage said stop and restrain said scoop from revolving, said engager being movable from engaging to non-engaging position; pressure-resisting means for retaining said engager in engaging position; and backup-means carried by said latch-means, said backup-means being engaged by said stop when said scraper is backed, said backup-means being movable relative to said latch-means so that said stop may move into engagement with said engager.

7. A rotary scraper comprising: a scoop; a main frame, said scoop being pivoted thereto; latch-means supported by said main frame; a stop carried by said scoop; an engager carried by said latch-means adapted to engage said stop and restrain said scoop from revolving, said engager being movable from engaging to non-engaging position; pressure-resisting means for retaining said engager in engaging position against the normal tendency of said scoop to rotate forwardly; and release-means associated with said latch-means, said release-means being adapted to move said latch-means so as to disengage said engager and said stop.

8. A rotary scraper comprising: a scoop; a main frame, said scoop being pivoted thereto; latch-means supported by said main frame; a stop carried by said scoop; an engager carried by said latch-means adapted to engage said stop and restrain said scoop from revolving, said engager being movable from engaging to non-engaging position; pressure-resisting means for retaining said engager in engaging position; backup-means carried by said latch-means, said backup-means being engaged by said stop when said scraper is backed; and release means associated with said latch-means, said release-means being adapted to move said latch-means so as to disengage said engager and said stop.

9. A rotary scraper comprising: a scoop; a main frame, said scoop being pivoted thereto; latch-means supported by said main frame; a stop carried by said scoop; an engager carried by said latch-means adapted to engage said stop and restrain said scoop from revolving, said engager being movable from engaging to non-engaging position; pressure-resisting means for retaining said engager in engaging position; backup-means carried by said latch-means, said backup-means being engaged by said stop when said scraper is backed, said backup-means being movable relative to said latch-means so that said stop may move into engagement with said engager; and release-means associated with said latch-means, said release-means being adapted to move said latch-means so as to disengage said engager and said stop.

10. A rotary scraper comprising: a main frame; a scoop pivoted to said main frame; pull-means carried by said main frame; latch-means for restraining said scoop from revolving; a lever connected to said pull-means and said latch-means; a stop carried by said scoop; an engager carried by said latch-means adapted to engage said stop and restrain said scoop from revolving; and back-up means carried by said latch-means, said backup-means being engaged by said stop when said scraper is backed.

11. A rotary scraper comprising; a main frame; a scoop pivoted to said main frame; pull-means carried by said main frame; latch-means for restraining said scoop from revolving; a lever connected to said pull-means and said latch-means, said lever being pivoted to said main frame; means for adjusting the relative lengths of the lever-arms of said lever; a stop carried by said scoop; an engager carried by said latch-means adapted to engage said stop and restrain said scoop from revolving; and back-up-means carried by said latch-means, said backup-means being engaged by said stop when said scraper is backed.

12. In a scraping and leveling device, a revolving scoop having carrying, digging, and dumping positions, a draft frame connected with the scoop, a rocker on the frame adapted for connection with a motive power, means connected with the rocker and engaged with the scoop to maintain the latter against rearward movement out of the carrying position, and means carried by the maintaining means for releasably holding the scoop in carrying position.

13. In a scraping and leveling device, a scoop having carrying, digging, and dumping positions, draft actuated means for maintaining the scoop against forward movement into digging position, and a detent on the maintaining means for successively maintaining the scoop against rearward movement out of its carrying, digging, and dumping positions.

14. In a scraping and leveling device, a revolving scoop having carrying, digging, and dumping positions, a draft frame connected with the scoop, a rocker on the frame adapted for connection with a motive power, means actuated by the rocker and engaged with the scoop to maintain the latter against rearward movement out of the carrying position and being movable to tilt the scoop into digging position, and means carried by the rocker actuated means and releasably maintained in engagement with the scoop for holding the scoop successively in the carrying and dumping positions.

15. In a scraping and leveling device, a scoop having carrying, digging and dumping positions, a draft actuated means for maintaining the scoop against forward movement into digging position, a detent on the draft actuated means for holding the scoop against rearward movement out of carrying position, and means for moving the draft actuated means whereby to cause the detent to move the scoop into digging position, said maintaining means retaining engagement with the scoop whereby to hold the latter in digging position.

16. In a scraping and leveling device: a frame; a rotatable scoop supported in the frame and having carrying, digging, and dumping positions; a rocker mounted on the frame forming a part of a draft means; stops on the scoop corresponding to the dumping and carrying positions, and means operable by the rocker and normally engaged with one of the said stops for maintaining the scoop in carrying position while pull is exerted on the rocker, said operable means being movable to permit the scoop to tilt into digging position; and means on said operable means engaged with said stop for maintaining the scoop against rearward rotation from carrying position.

17. In a scraping and leveling device: a revolvable scoop have carrying, digging, and dumping positions, the former being the normal position of the scoop; a draft frame connected with the scoop; a rocker on the draft frame; a bar connected with one end of the rocker and having its other end engaged with the scoop whereby to maintain the latter against rearward revolving movement out of carrying position, the other end of the rocker being adapted for connection with a pulling power; and an engager carried by said bar releasably engaged with the scoop for maintaining the scoop against forward revolving movement into digging position.

18. In a scraping and leveling device: a revolving scoop having carrying, digging, and dumping positions, the former being the normal position of the scoop; a draft frame connected with the scoop; a rocker on the frame adapted for connection with a motive power; means actuated by the rocker and engaged with the scoop to maintain the latter against rearward movement out of the carrying position, and being movable to tilt the scoop into digging position; and means carried by the rocker actuated means and releasably maintained in engagement with the scoop for holding the scoop successively in the carrying and dumping positions.

19. In a scraping and leveling device: a scoop having carrying, digging and dumping positions; draft actuated means for maintaining the scoop against forward movement into digging position; an engager on the draft actuated means for holding the scoop against rearward movement out of carrying position; and means for moving the draft actuated means whereby to cause the engager to move the scoop into digging position, said maintaining means retaining engagement with the scoop whereby to hold the latter in digging position.

20. In a scraper of the character described the combination of: a main frame; a scoop pivoted to one end of said main frame; a latch-means carried by said main frame; a stop carried by said scoop; and an engager pivoted to said latch-means for yieldably engaging said stop and preventing a forward rotation of said scoop.

21. In a scraper of the character described the combination of: a main frame; a scoop pivoted to one end of said main frame; a latch-means carried by said main frame; a stop carried by said scoop, an engager pivoted to said latch-means and adapted to engage said stop; and means for yieldably and releasably holding said engager in engagement with said stop.

22. In a scraper of the character described the combination of: a main frame; a scoop pivoted to one end of said main frame; a draft mechanism pivoted to said main frame whereby said scraper is pulled, and provided with a part extending over said scoop; a stop on said scoop; and an engager associated with the part of said draft mechanism extending over said scoop, said engager being adapted to engage said stop.

23. In a scraper of the character described the combination of: a main frame; a scoop pivoted to one end of said main frame; a draft mechanism pivoted to said main frame whereby said scraper is pulled; a stop on said scoop; an engager pivotally associated with said draft mechanism and adapted to engage said stop; and means acting in opposition to the pressure thereon by said stop, for releasably holding said engager in engagement with said stop.

24. In a scraper of the character described the combination of: a main frame; a scoop pivoted to one end of said main frame; a draft mechanism pivoted to said main frame whereby said scraper is pulled, and provided with a part extending over said scoop; a stop on said scoop; an engager pivotally associated with the part of said draft mechanism extending over said scoop, said engager being adapted to engage said stop; and means for releasably holding said engager in engagement with said stop.

25. In a scraper of the class described the combination of: a main frame; a scoop pivoted to said main frame; a rocker pivoted to said main frame, said rocker including an upper lever and a lower lever; a draft member connected to said lower lever whereby said scraper is pulled; a latch frame pivoted to said upper lever, one end of said latch frame extending over said scoop; a stop on said scoop; and an engager carried by said end of said latch frame which extends over said scoop, said engager being adapted to engage said stop.

26. In a scraper of the class described the combination of: a main frame; a scoop pivoted to said main frame; a rocker pivoted to said main frame, said rocker including an upper lever and a lower lever; a draft member connected to said lower lever whereby said scraper is pulled; a latch frame pivoted to said upper lever, one end of said latch frame extending over said scoop; a stop on said scoop; an engager pivotally carried by said end of said latch frame which extends over said scoop, said engager being adapted to engage said stop; and means for releasably holding said engager in engagement with said stop.

27. In a scraper of the class described the combination of: a main frame; a scoop pivoted to said main frame; a rocker pivoted to said main frame, said rocker including an upper lever and a lower lever; a draft member connected to said lower lever whereby said scraper is pulled; a latch frame pivoted to said upper lever, one end of said latch frame extending over said scoop; a stop on said scoop; and means carried by said end of said latch frame for engaging said stop and limiting the horizontal movement thereof.

28. In a rotary scraper, the combination of: a main frame; a scoop pivotally attached to and supporting one end of said frame, said scoop being capable of turning a full revolution on the pivot between said scoop and said main frame; latch-means engaging said scoop; draft-means connected to said main frame and said latch-means, by means of which said rotary scraper is moved along the ground, said draft-means exerting a force on said latch-means tending to move said latch-means in effort to rotate said scoop into carrying position; and means for manually moving said latch-means in opposition to the force exerted thereon through said draft-means.

29. In a rotary scraper, the combination of: a main frame; a scoop pivotally attached to and supporting one end of said main frame, said scoop being capable of turning a full revolution on the pivot between said scoop and said main frame; latch-means engaging said scoop; a lever pivoted to said main frame and having an upper lever-arm above said main frame and a lower lever-arm below said main frame, said upper lever-arm being connected to said latch-means; and means for connecting said lower lever-arm to a draft vehicle.

30. In a rotary scraper, the combination of: a main frame; a scoop pivotally attached to and supporting one end of said main frame, said scoop being capable of turning a full revolution on the pivot between said scoop and said main frame; latch-means engaging said scoop; a lever pivoted to said main frame and having an upper lever-arm above said main frame and a lower lever-arm below said main frame, said upper lever-arm being connected to said latch-means; means for connecting said lower lever-arm to a draft vehicle; and adjusting means for changing the length of one of said lever-arms.

31. In a scraper of the character described, the combination of: a main frame; a scoop pivoted to and supporting one end of said main frame; pull means carried by said main frame; latch means for restraining said scoop from revolving; a lever connected to said pull means and said latch means, said lever being pivoted to said main frame, and said pull means being connected to said main frame at one end by said lever; and a link for connecting the other end of said pull means to said main frame.

32. In a scraper of the character described, the combination of: a main frame; a scoop pivoted to and supporting one end of said main frame; pull means carried by said main frame; latch means for restraining said scoop from revolving; a lever having a primary lever arm pivoted to said frame and connected to one of said means; a secondary lever arm slidable relative to said primary lever arm and in a manner to vary the effective length thereof; and adjusting means connected to said primary and said secondary lever arms.

33. In a rotary scraper, the combination of: a main frame; a scoop pivotally attached to and supporting one end of said main frame, said scoop being capable of turning a full revolution on the pivot between said scoop and said main frame; latch means engaging said scoop; a lever pivoted to said main frame and having an upper lever arm above said main frame, and a lower lever arm below said main frame, said upper lever arm being connected to said latch means; means for connecting said lower lever arm to a draft vehicle; means operable from said draft vehicle for disengaging said latch means from said scoop; and a control lever associated with said main frame and operable from said draft vehicle to move said latch means forwardly to rotate said scoop into digging position.

34. In a rotary scraper, the combination of: a main frame; a scoop pivotally attached to and supporting one end of said main frame, said scoop being capable of turning a full revolution on the pivot between said scoop the said main frame; latch means engaging said scoop; a lever pivoted to said main frame and having an upper lever arm above said main frame, and a lower lever arm below said main frame, said upper lever arm being connected to said latch means; means for connecting said lower lever arm to a draft vehicle; adjusting means for changing the relative length of said lever arms; means operable from said draft vehicle for disengaging said latch means from said scoop; and a control lever associated with said main frame and operable from said draft vehicle to move said latch means forwardly to rotate said scoop into digging position.

In testimony whereof, I have hereunto set my hand at Long Beach, California, this 13th day of May, 1927.

JOSEPH S. REYNOLDS.